(12) United States Patent
Liu et al.

(10) Patent No.: US 8,032,194 B2
(45) Date of Patent: Oct. 4, 2011

(54) HOUSING OF PORTABLE ELECTRONIC DEVICES

(75) Inventors: Ye Liu, Shenzhen (CN); Hsiao-Hua Tu, Taipei Hsien (TW); Xin-Quan Zhou, Shenzhen (CN); Zhong-Shu Qin, Shenzhen (CN); Xu-Ri Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 715 days.

(21) Appl. No.: 12/133,497

(22) Filed: Jun. 5, 2008

(65) Prior Publication Data
US 2009/0215412 A1  Aug. 27, 2009

(30) Foreign Application Priority Data
Feb. 25, 2008  (CN) .......................... 2008 1 0300397

(51) Int. Cl.
*H04M 1/00* (2006.01)
*H04K 3/00* (2006.01)
(52) U.S. Cl. .................. 455/575.8; 455/90.3; 277/591; 379/433.01

(58) Field of Classification Search ................. 455/90.3, 455/575.8; 277/591, 637–651; 379/433.01
See application file for complete search history.

(56) References Cited

U.S. PATENT DOCUMENTS
3,329,447 A * 7/1967 Hitz .............................. 285/113
5,687,975 A   11/1997 Inciong
5,946,395 A * 8/1999 Petrella et al. ........... 379/433.01

FOREIGN PATENT DOCUMENTS
CN           1662128 A        8/2005
WO      WO2005/086607    *  9/2005

* cited by examiner

*Primary Examiner* — Lee Nguyen
(74) *Attorney, Agent, or Firm* — Altis Law Group, Inc.

(57) ABSTRACT

A housing (10) of a portable electronic device includes an upper housing (11), a lower housing (12) and a protecting component (13). The upper housing defines a first latching member (1112) therein. The lower housing defines a second latching member (121) therein. The protecting component is assembled between the upper housing and the lower housing for preventing dust and vapor from entering the electronic device and defines a first latching portion (1313) corresponding to the first latching member and a second latching portion (1314) corresponding to the second latching member. The first latching portion and the second latching member respectively cooperate with the first latching member and the second latching member to assemble the upper housing, the lower housing and the protecting component together.

14 Claims, 8 Drawing Sheets

HOUSING OF PORTABLE ELECTRONIC DEVICES

BACKGROUND OF THE INVENTION

1. Field of the Invention

The present invention relates to housings of portable electronic devices, particularly to a waterproof and dustproof housing of portable electronic devices.

2. Description of Related Art

Nowadays, portable electronic devices such as mobile phones, laptops and personal digital assistants (PDA) are widely used. Generally, a portable electronic device includes an upper housing and a lower housing assembled together to form a whole housing by means of latching, bolting, etc.

However, in assembly of a portable electronic device, an aperture is prone to exist between the upper housing and the lower housing. In use, vapor and dust may enter the portable electronic device through the aperture, and may cause damages to inner circuits of the portable electronic device.

Therefore, a new housing of portable electronic devices is desired in order to overcome the above-described shortcomings.

BRIEF DESCRIPTION OF THE DRAWINGS

Many aspects of the present housing of portable electronic devices can be better understood with reference to the following drawings. The components in the various drawings are not necessarily drawn to scale, the emphasis instead being placed upon clearly illustrating the principles of the present housing of portable electronic devices. Moreover, in the drawings, like reference numerals designate corresponding parts throughout the diagrams.

DETAILED DESCRIPTION OF THE INVENTION

Figure 1:
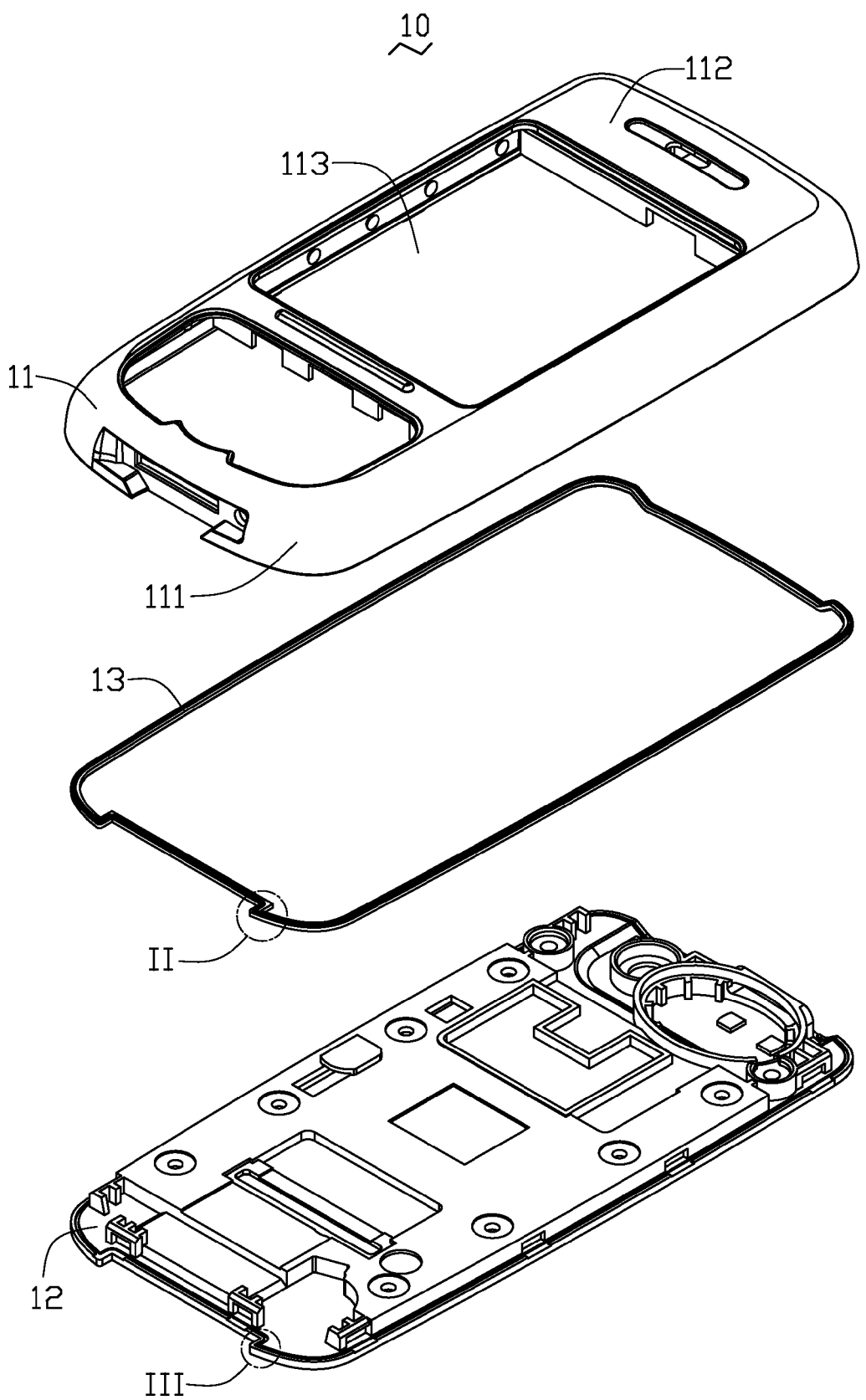
FIG. 1 is a disassembled view of a housing, according to an exemplary embodiment.

Referring to FIG. 1, a housing 10 according to an exemplary embodiment, such as a mobile phone, is shown. The housing 10 includes an upper housing 11, a lower housing 12 and a protecting component 13 located between the upper housing 11 and the lower housing 12.

Figure 4:
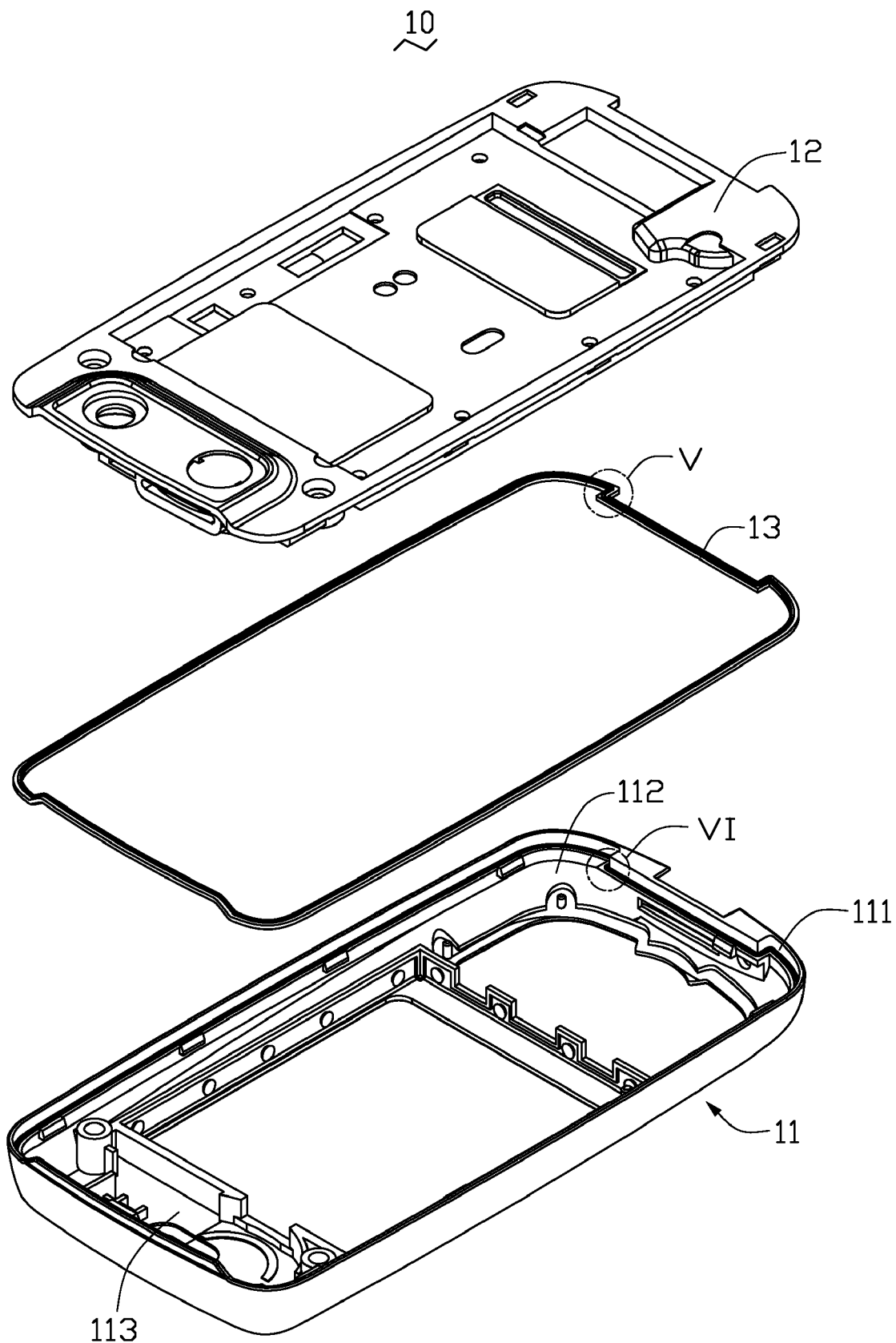
FIG. 4 is similar to FIG. 1, but shown in another visual angle.
Figure 6:
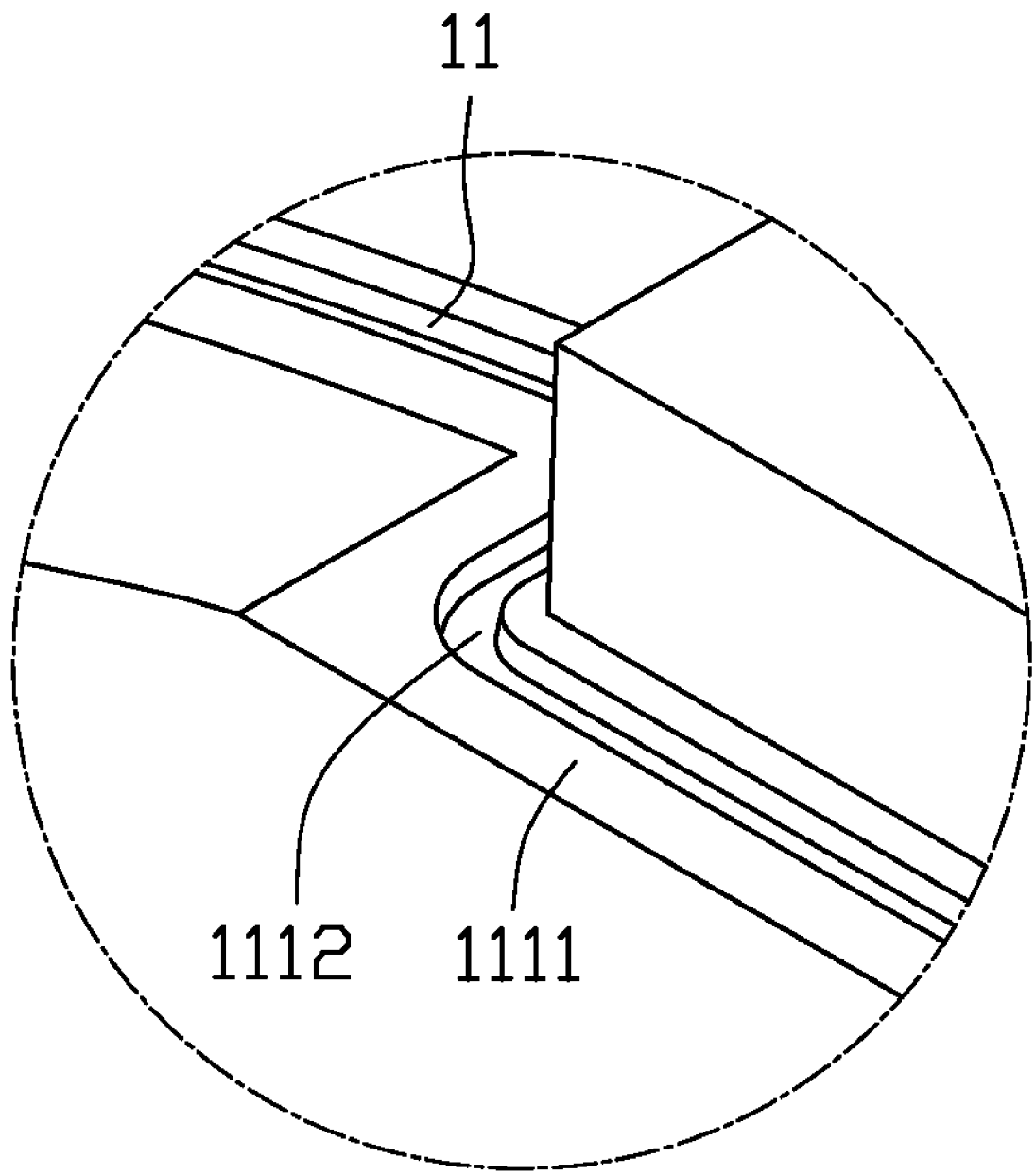
FIG. 6 is an enlarged view of the portion VI shown in FIG. 5.

Also referring to FIG. 4, the upper housing 11 includes a sidewall 111 formed on a peripheral thereof and another wall 112 formed at an end thereof. The sidewall 111 cooperates the wall 112 to form a receiving space 113 for receiving circuits (not shown) of the portable electronic device. Also referring to FIG. 6, the sidewall 111 includes a first assembling surface 1111, which partially recesses to define a first latching member 1112 therein. The first latching member 1112 is a loop groove surrounding the bottom wall 112.

Figure 3:
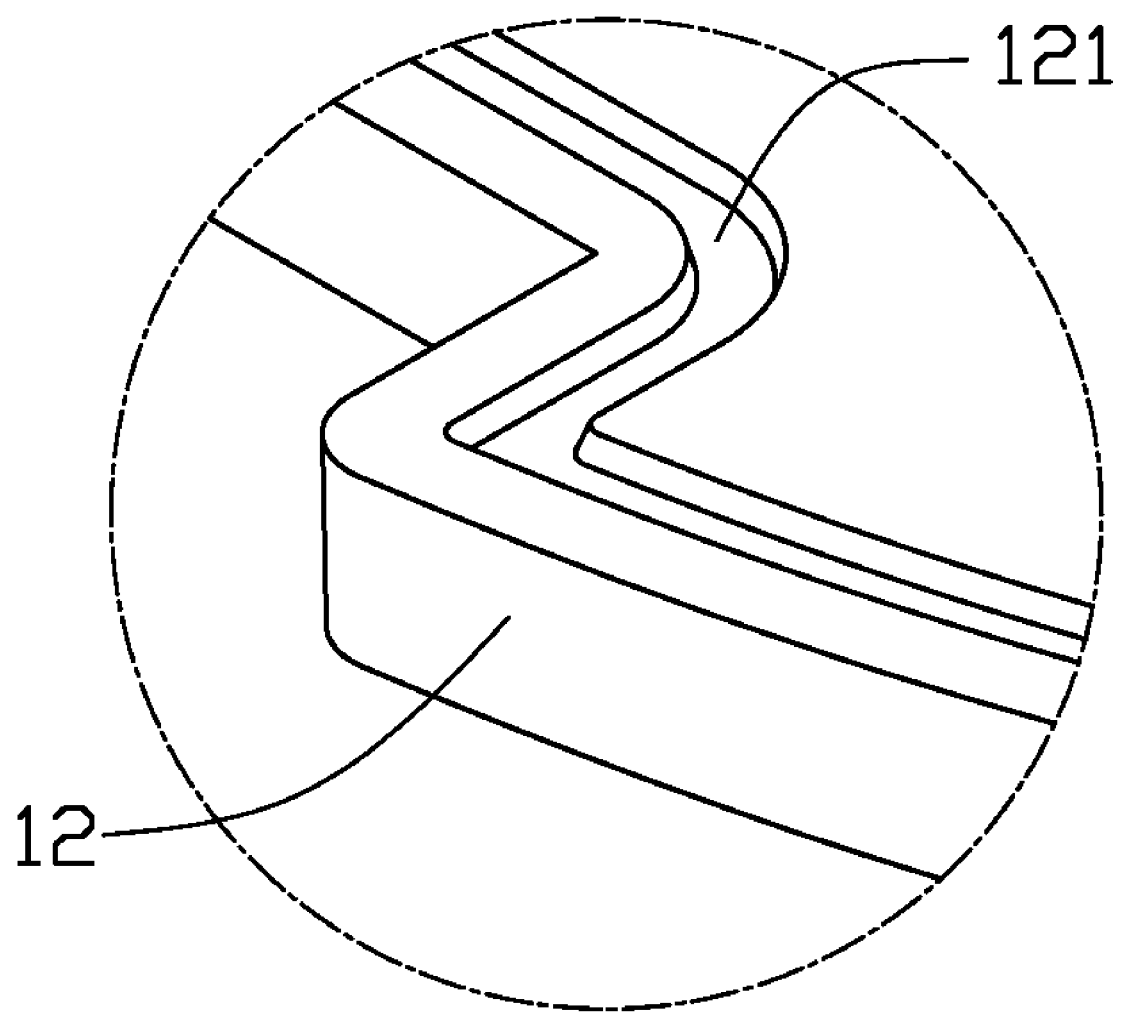
FIG. 3 is an enlarged view of the portion III shown in FIG. 1.

Also referring to FIG. 3, the lower housing 12 is approximately a rectangular board and has a second latching member 121 defined at its peripheral portion and corresponding to the first latching member 1112. The second latching member 121 is a loop groove having a shape and a size similar to that of the first latching member 1112.

Figure 2:
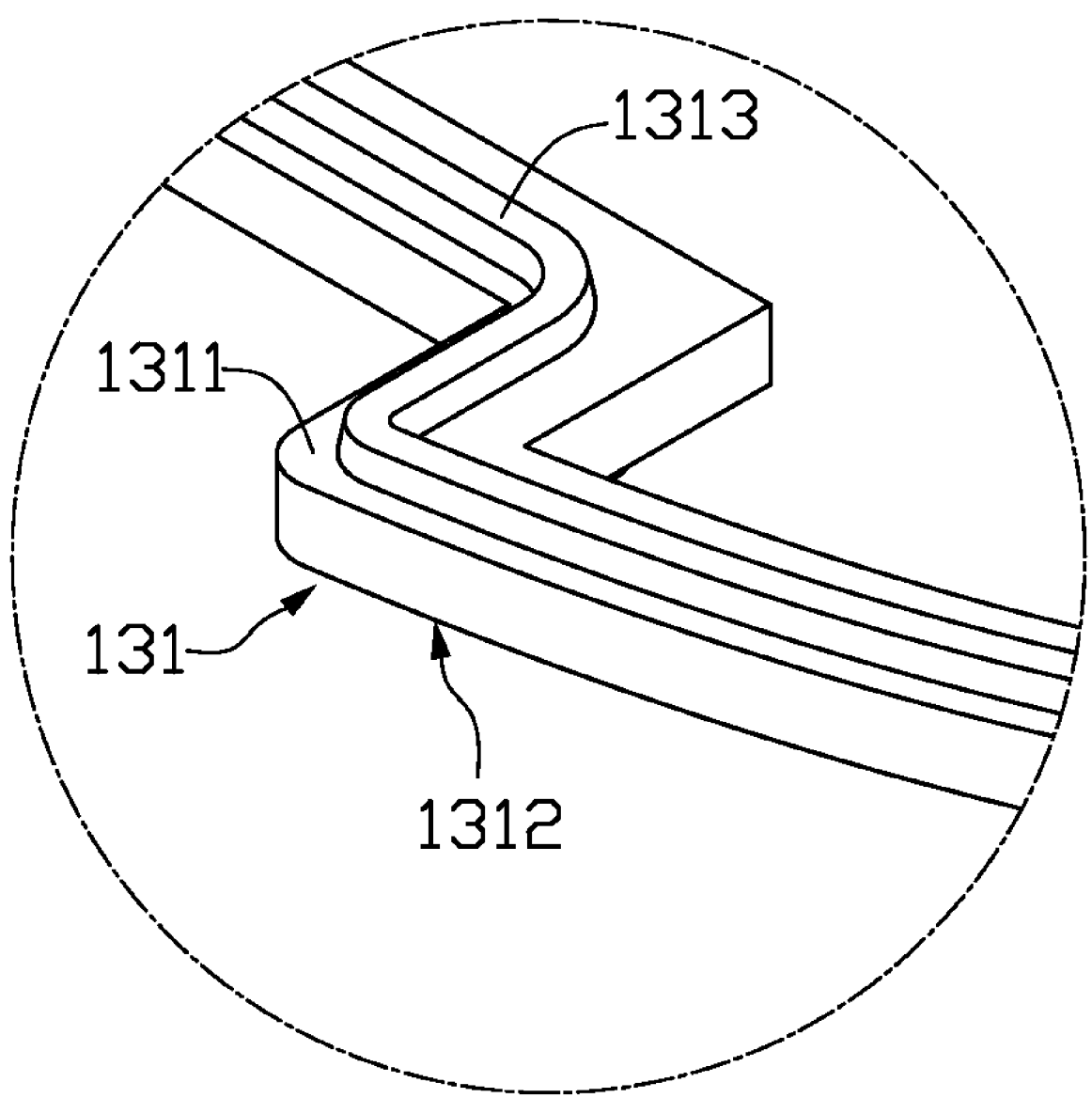
FIG. 2 is an enlarged view of the portion II shown in FIG. 1.
Figure 5:
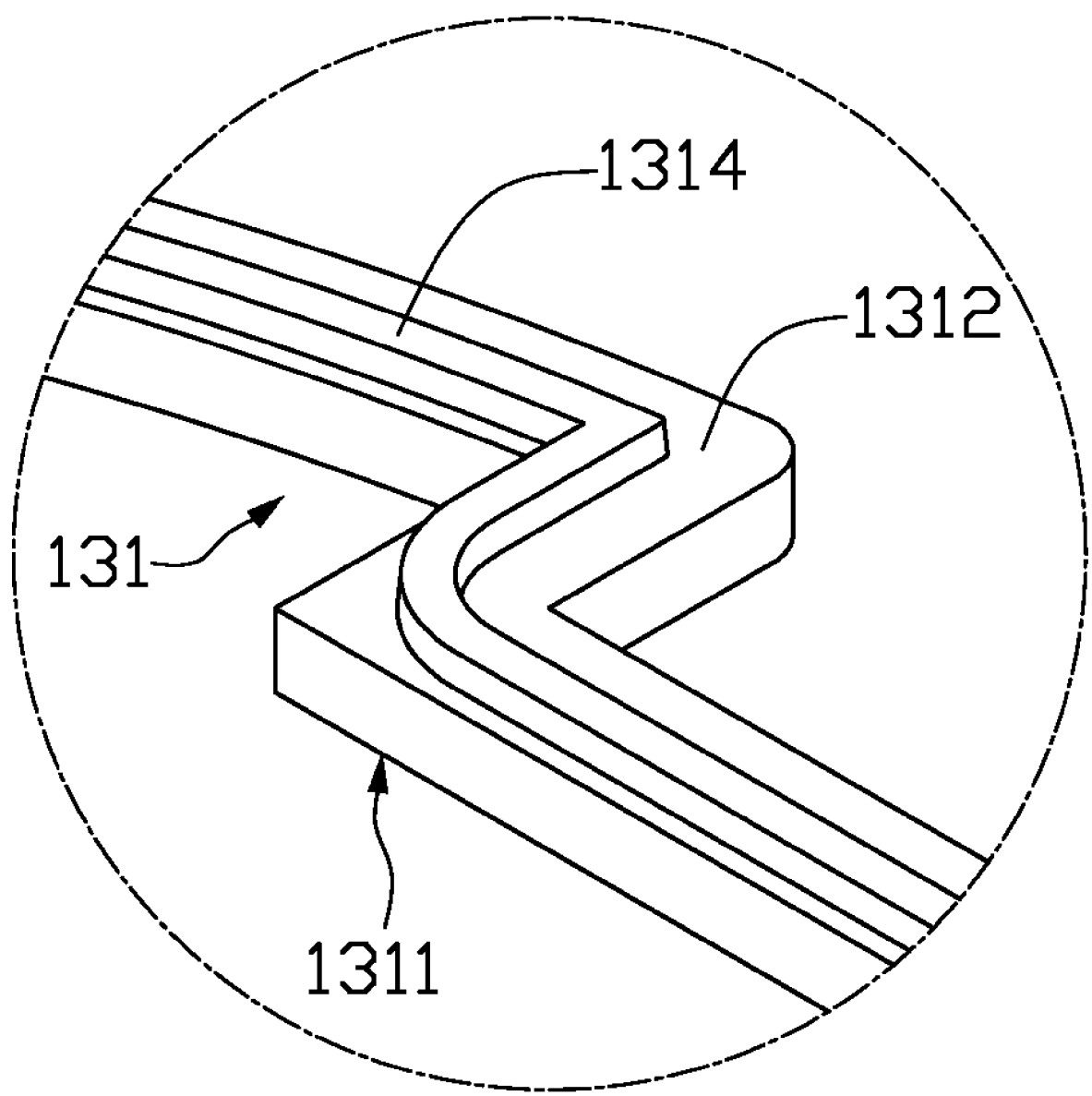
FIG. 5 is an enlarged view of the portion V shown in FIG. 4.
Figure 7:
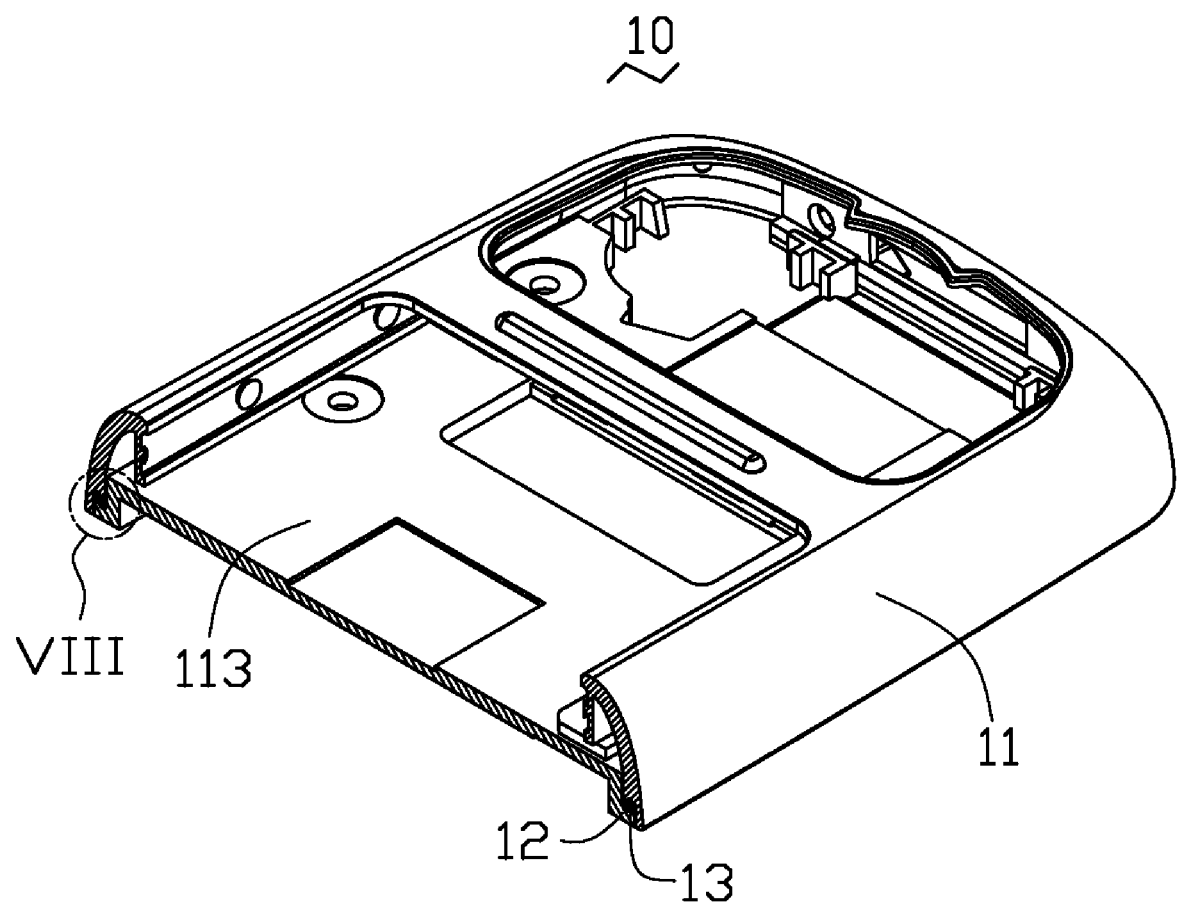
FIG. 7 is an assembled view of the housing shown in FIG. 1 and FIG. 4.
Figure 8:
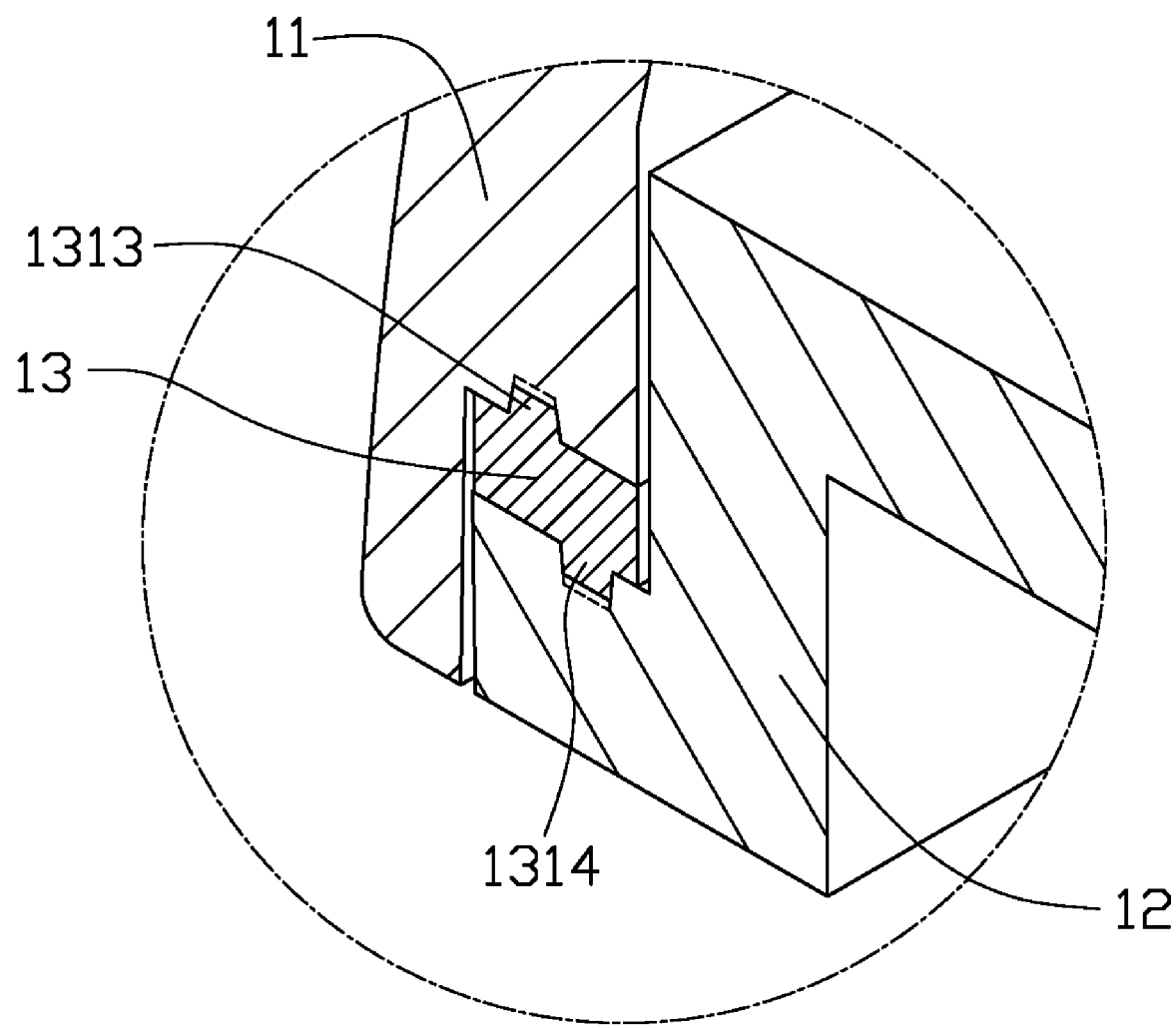
FIG. 8 is an enlarged view of the portion VIII shown in FIG. 7.

Also referring to FIG. 2 and FIG. 5, the protecting component 13 is a gasket made of elastic materials such as rubber, resin or silicone. Also referring to FIG. 7 and FIG. 8, the protecting component 13 includes a main portion 131, a first latching portion 1313 and a second latching portion 1314. The main portion 131 is approximately a rectangular frame having a first surface 1311 and an opposite second surface 1312. The first latching portion 1313 is a loop protrusion formed on the first surface 1311. A shape of the first latching portion 1313 corresponds to that of the first latching member 1112, and a size of the first latching portion 1313 is larger than that of the first latching member 1112. The second latching portion 1314 is a loop protrusion formed on the second surface 1312. A shape of the second latching portion 1314 corresponds to that of the second latching member 121, and a size of the second latching portion 1314 is larger than that of the second latching member 121.

In assembly, the first latching portion 1313 of the protecting component 13 is facing towards the first latching member 1112 of the upper housing 11 and inserted into the first latching member 1112. The second latching portion 1314 of the protecting component 13 is facing towards the second latching member 121 of the lower housing 12 and inserted into the second latching member 121. In this way, the first latching portion 1313 and the second latching portion 1314 are deformed, and then respectively engage the first latching member 1112 and the second latching member 121. The upper housing 11 and the lower housing 12 are then assembled together via bolting. Thus, the protecting component 13 is assembled between upper housing 11 and the lower housing 12. The first latching portion 1313 and the second latching member 1314 respectively cooperates with the first latching member 1112 and the second latching member 121 to assemble the upper housing 11, the lower housing 12 and the protecting component 13 together forming the housing 10.

Understandably, when the upper housing 11 and the lower housing 12 are driven towards each other, the first latching portion 1313 and the second latching portion 1314 respectively engaging in the first latching member 1112 and the second latching member 121 are pressed and deformed to fill the first latching member 1112 and the second latching member 121. In this way, an aperture (not labeled) between the upper housing 11 and the lower housing 12 is sealed by the protecting component 13.

Furthermore, cross sections of the first latching portion 1313 and the second latching portion 1314 can be in different shapes, such as rectangular, triangular, semicircular, trapezoidal, etc. The first latching member 1112 and the second latching member 121 can also be defined in the protecting component 13. Correspondingly, the first latching portion 1313 and the second latching portion 1314 can be respectively formed on the upper housing 11 and the lower housing 12.

In the present housing 10, the protecting component 13 is located between the upper housing 11 and the lower housing 12 to seal the aperture formed therebetween, thus outside dusts and vapor is prevented from entering. In this way, the housing 10 is dustproof and waterproof.

It is to be further understood that even though numerous characteristics and advantages of the present embodiments have been set forth in the foregoing description, together with details of structures and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A housing of a portable electronic device, comprising:
an upper housing defining a first latching member therein;
a lower housing defining a second latching member therein; and
a protecting component assembled between the upper housing and the lower housing for preventing dust and vapor from entering the electronic device, and defining a first latching portion corresponding to the first latching member and a second latching portion corresponding to the second latching member, the first latching portion and the second latching portion respectively cooperating with the first latching member and the second latching member to assemble the upper housing, the lower housing and the protecting component together; the upper housing and the lower housing respectively covering an outside surface and an inside surface of the protecting component, such that the protecting component is encapsulated between the upper housing and the lower housing.

2. The housing as claimed in claim 1, wherein the protecting component is a gasket made of elastic material.

3. The housing as claimed in claim 2, wherein the protecting component includes a main portion having a first surface and an opposite second surface, the first latching portion formed on the first surface, and the second latching portion formed on the second surface.

4. The housing as claimed in claim 3, wherein the outside surface and the inner surface of the protecting component are formed on the main portion, and are substantially perpendicular to the first surface and the second surface.

5. The housing as claimed in claim 2, wherein the first latching member and the second latching member are both loop grooves, the first latching portion is a protrusion corresponding to the first latching member and the second latching portion is a protrusion corresponding to the second latching member.

6. The housing as claimed in claim 5, wherein the first latching portion has a shape corresponding to that of the first latching member and a size larger than that of the first latching member, and the second latching portion has a shape corresponding to that of the second latching member and a size larger than that of the second latching member.

7. The housing as claimed in claim 6, wherein the first latching portion is inserted into the first latching member, and the second latching portion of the protecting component is inserted into the second latching member.

8. The housing as claimed in claim 7, wherein the first latching portion and the second latching portion are respectively pressed and deformed to fill the first latching member and the second latching member.

9. A housing of a portable electronic device, comprising:
a first housing including a peripheral sidewall and defining a first latching member in the sidewall;
a second housing defining a second latching member in a peripheral portion thereof; and
a protecting component including a first latching portion facing the first latching member and a second latching portion facing the second latching member; wherein, as the protecting component is secured between the first housing and the second housing, the first latching portion and the second latching portion are respectively deformed thus engaging the first latching member and the second latching member, and the first housing and the second housing respectively cover an outside surface and an inside surface of the protecting component, such that the protecting component is encapsulated between the first housing and the second housing.

10. The housing as claimed in claim 9, wherein the protecting component is a gasket made of elastic material.

11. The housing as claimed in claim 10, wherein the protecting component includes a main portion having a first surface and an opposite second surface, the first latching portion is formed on the first surface, and the second latching portion is formed on the second surface.

12. The housing as claimed in claim 11, wherein the outside surface and the inner surface of the protecting component are formed on the main portion, and are substantially perpendicular to the first surface and the second surface.

13. The housing as claimed in claim 10, wherein the first latching member and the second latching member are both loop grooves, the first latching portion is a protrusion corresponding to the first latching member and the second latching portion is a protrusion corresponding to the second latching member.

14. The housing as claimed in claim 13, wherein the first latching portion has a shape corresponding to that of the first latching member and a size larger than that of the first latching member, and the second latching portion has a shape corresponding to that of the second latching member and a size larger than that of the second latching member.

* * * * *